(12) United States Patent
You et al.

(10) Patent No.: US 10,078,173 B2
(45) Date of Patent: Sep. 18, 2018

(54) DISPLAY DEVICE

(71) Applicant: Samsung Display Co., Ltd., Yongin-Si, Gyeonggi-Do (KR)

(72) Inventors: Junwoo You, Seongnam-si (KR); Taeho Lee, Hwaseong-si (KR); Sunhee Oh, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/691,142

(22) Filed: Aug. 30, 2017

(65) Prior Publication Data

US 2018/0081110 A1    Mar. 22, 2018

(30) Foreign Application Priority Data

Sep. 19, 2016  (KR) .................. 10-2016-0119434

(51) Int. Cl.
*F21V 7/04* (2006.01)
*F21V 8/00* (2006.01)

(52) U.S. Cl.
CPC ......... *G02B 6/0055* (2013.01); *G02B 6/0035* (2013.01); *G02B 6/0081* (2013.01)

(58) Field of Classification Search
CPC .... G02B 6/0035; G02B 6/005; G02B 6/0055; G02B 6/0081; G02F 1/167; G02F 2201/44
USPC ......................................... 362/611
See application file for complete search history.

(56) References Cited

U.S. PATENT DOCUMENTS

| 8,319,913 | B2 | 11/2012 | Hong et al. |
| 9,348,082 | B2 | 5/2016 | Atkins |
| 2016/0349430 | A1* | 12/2016 | Li ................ G02B 6/005 |
| 2017/0269283 | A1* | 9/2017 | Wang ............. G02B 6/0016 |

FOREIGN PATENT DOCUMENTS

| KR | 101252092 B1 | 4/2013 |
| KR | 1020160045235 A | 4/2016 |

* cited by examiner

*Primary Examiner* — Laura Gudorf
(74) *Attorney, Agent, or Firm* — Cantor Colburn LLP

(57) ABSTRACT

A display device includes a backlight unit and a display panel disposed on the backlight unit. The backlight unit includes a light guide plate including a plurality of charged particles, a light source unit disposed at a side of the light guide plate and providing light to the light guide plate, and a transparent electrode disposed under the light guide plate. Each of the plurality of charged particles includes first and second charged portions which have charge values of which polarities are different from each other. The first charged portion reflects the light received from the light source unit, and the second charged portion absorbs the light received from the light source unit. Positions of the first and second charged portions of each of the plurality of charged particles are controlled based on a voltage applied to the transparent electrode.

15 Claims, 12 Drawing Sheets

DISPLAY DEVICE

This application claims priority to Korean Patent Application No. 10-2016-0119434, filed on Sep. 19, 2016, and all the benefits accruing therefrom under 35 U.S.C. § 119, the content of which in its entirety is herein incorporated by reference.

BACKGROUND

Exemplary embodiments of the invention relate to a display device and, more particularly, to a display device including an edge-type backlight unit capable of performing a local dimming function.

The display device may include a liquid crystal display ("LCD") device, a plasma display panel ("PDP") device, an organic light emitting display ("OLED") device, a field effect display ("FED") device, and an electrophoretic display ("EPD") device.

The LCD device is widely used in televisions, portable devices, and monitors. The LCD device may have a liquid crystal panel that includes two substrates facing each other and a liquid crystal layer disposed between the two substrates.

Since the LCD device is a light-receiving display device that can not emit light itself, a backlight unit including a light source which supplies light may be disposed on a rear surface of the liquid crystal panel.

The backlight unit may be classified into a direct-type backlight unit or an edge-type backlight unit on the basis of a position of a light source. A light source of the direct-type backlight unit is disposed under the liquid crystal panel, and thus light emitted from the light source is supplied directly to the liquid crystal panel. In the edge-type backlight unit, a light guide plate is disposed under the liquid crystal panel and a light source is disposed at a side of the light guide plate. Thus, light emitted from the light source may be refracted and reflected in the light guide plate so as to be supplied in a less direct manner to the liquid crystal panel relative to the direct-type backlight unit.

SUMMARY

Exemplary embodiments of the invention are directed to a display device including an edge-type backlight unit capable of performing a 2-dimensional ("2D") local dimming function.

According to an exemplary embodiment, a display device includes a backlight unit and a display panel disposed on the backlight unit. The backlight unit includes a light guide plate including a plurality of charged particles, a light source unit disposed at a side of the light guide plate and which provides light to the light guide plate, and a transparent electrode disposed under the light guide plate. Each of the plurality of charged particles comprises a first charged portion and a second charged portion, which have charge values of which polarities are different from each other. The first charged portion reflects the light received from the light source unit, and the second charged portion absorbs the light received from the light source unit. Positions of the first and second charged portions of each of the plurality of charged particles are controlled based on a voltage applied to the transparent electrode.

In an exemplary embodiment, the first charged portion may have a positive charge value, and the second charged portion may have a negative charge value.

In an exemplary embodiment, the backlight unit further comprises a reflection sheet disposed under the light guide plate, the light guide plate may include a plurality of areas, and each of the plurality of areas may operate in a first mode where the charged particles in the area reflects the light received from the light source unit or in a second mode where the charged particles in the area absorbs the light received from the light source unit. In the first mode, the first charged portion of the charged particles in the area may face the display panel, and the second charged portion of the charged particles in the area may face the reflection sheet. In the second mode, the second charged portion of the charged particles in the area may face the display panel and the first charged portion of the charged particles in the area may face the reflection sheet.

In an exemplary embodiment, the light guide plate may include a light incident surface on which the light is incident, an opposite surface opposite to the light incident surface, a light exit surface which connects the light incident surface and the opposite surface, and a rear surface opposite to the light exit surface. The plurality of charged particles may be disposed to be adjacent to the rear surface.

In an exemplary embodiment, a surface of each of the plurality of charged particles may be divided into a white surface and a black surface. The first charged portion may include the white surface, and the second charged portion may include the black surface.

In an exemplary embodiment, the first charged portion may include a white pigment, and the second charged portion may include a black pigment.

In an exemplary embodiment, the display device may further include a protective layer which surrounds each of the plurality of charged particles.

In an exemplary embodiment, the light source unit may include a printed circuit board and a plurality of light sources spaced apart from each other on the printed circuit board. The plurality of light sources may be driven independently of each other.

In an exemplary embodiment, the transparent electrode may include a plurality of sub-transparent electrodes spaced apart from each other. The plurality of sub-transparent electrodes may be controlled independently of each other.

In an exemplary embodiment, each of the plurality of sub-transparent electrodes may have a rod shape when viewed in a plan view.

In an exemplary embodiment, each of the plurality of sub-transparent electrodes may have a square shape when viewed in a plan view.

In an exemplary embodiment, the transparent electrode may be disposed on a top surface of the reflection sheet.

In an exemplary embodiment, the transparent electrode may be disposed on a bottom surface of the reflection sheet. In this case, the display device may further include a sealing layer disposed on the bottom surface of the reflection sheet and which covers the transparent electrode.

In an exemplary embodiment, a distribution density of the plurality of charged particles may increase progressively from the light incident surface toward the opposite surface.

BRIEF DESCRIPTION OF THE DRAWINGS

The present disclosure will become more apparent in view of the attached drawings and accompanying detailed description.

DETAILED DESCRIPTION

Figure 1:
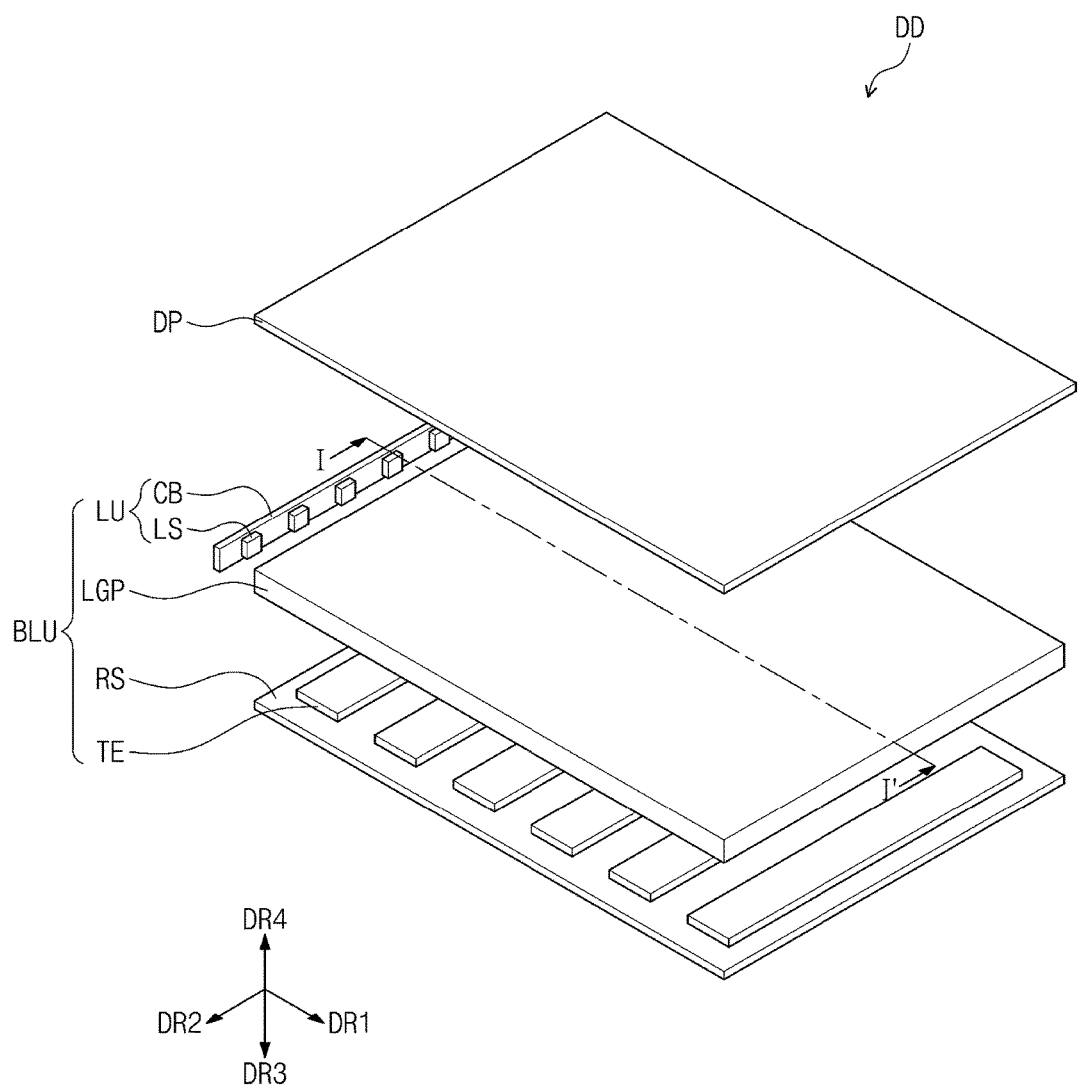
FIG. 1 is an exploded perspective view illustrating an exemplary embodiment of a display device.

This disclosure will now be described more fully hereinafter with reference to the accompanying drawings, in which exemplary embodiments of the invention are shown and described. The advantages and features of the invention and methods of achieving them will be apparent from the following exemplary embodiments that will be described in more detail with reference to the accompanying drawings. It should be noted, however, that the invention is not limited to the following exemplary embodiments, and may be implemented in various forms. Accordingly, the exemplary embodiments are provided only to disclose the invention and let those skilled in the art know the category of the invention.

The same reference numerals or the same reference designators denote the same elements throughout the specification. In the drawings, embodiments of the present disclosure are not limited to the specific examples provided herein and are exaggerated for clarity. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. As used herein, the singular forms "a", "an" and "the" are intended to include the plural forms as well, unless the context clearly indicates otherwise.

It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. It will be understood that when an element such as a layer, region or substrate is referred to as being "on" another element, it can be directly on the other element or intervening elements may be present. In contrast, the term "directly" means that there are no intervening elements. On the contrary, it will be understood that when an element such as a layer, region or substrate is referred to as being "beneath", "below" or "under" another element, it can be directly beneath, below or under the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of a display device according to the invention will be described hereinafter.

FIG. 1 is an exploded perspective view illustrating an exemplary embodiment of a display device.

Referring to FIG. 1, a display device DD according to an exemplary embodiment of the invention includes a backlight unit BLU and a display panel DP.

The display panel DP is disposed on the backlight unit BLU and is spaced apart from the backlight unit BLU. The backlight unit BLU supplies light to the display panel DP. In an exemplary embodiment, for example, the display panel DP may be one of various display panels such as a liquid crystal display ("LCD") panel and an electrophoretic display panel ("EDP"). It is preferable that the display panel DP may be the LCD panel. However, the display panel DP is not limited thereto.

The backlight unit BLU includes a light guide plate LGP, a light source unit LU, a reflection sheet RS, and a transparent electrode TE. Even though not shown in the drawings, an optical member may be provided between the light guide plate LGP and the display panel DP. The optical member may improve brightness and a viewing angle of light emitted from a light exit surface (e.g., 130 of FIG. 2) of the light guide plate LGP. The optical member may include a first optical member, a second optical member and a third optical member, which are sequentially stacked.

The first optical member may be a diffusion sheet that diffuses the light emitted from the light guide plate LGP. The second optical member may be a prism sheet that condenses the light diffused in the diffusion sheet in a direction perpendicular to a flat surface of the display panel DP disposed thereon. The third optical member may be a protective sheet that protects the prism sheet from an external impact. At least one of the first, second, and third optical members may be provided in plural in the optical member and may be omitted from the optical member.

The optical member is not limited to the above examples and may include other optical members generally known to persons having ordinary skill in the art, without limitation.

The reflection sheet RS is disposed under the light guide plate LGP. The reflection sheet RS reflects leakage light which does not travel toward the display panel DP such that the reflected leakage light travels toward the display panel DP. Thus, the reflection sheet RS may increase the amount of light provided to the display panel DP. The transparent electrode TE is disposed on a surface of the reflection sheet RS. The transparent electrode TE will be described later in more detail. One surface of the reflection sheet RS is parallel to a plane defined by a first direction DR1 and a second direction DR2. A thickness direction of the display device DD is indicated by a third direction DR3. The light guide plate LGP is spaced apart from the reflection sheet RS in a fourth direction DR4.

The light source unit LU provides light to the light guide plate LGP, and the light guide plate LGP guides the provided light in a direction toward the display panel DP (i.e., in the fourth direction DR4). The light source unit LU includes a printed circuit board CB and a light source LS disposed on one surface of the printed circuit board CB. The printed circuit board CB may be a flexible printed circuit board. In an exemplary embodiment, the printed circuit board CB may include a polymer resin to have flexibility, for example. However, the invention is not limited thereto.

In an exemplary embodiment, for example, the light source LS may include one or more light-emitting diodes ("LEDs"). In an exemplary embodiments, the light source unit LU may include a plurality of the light sources LS, and the plurality of light sources LS may be arranged in the second direction DR2 on the printed circuit board CB. The light sources LS may be spaced apart from each other in the second direction DR2 on the printed circuit board CB. The light source unit LU may be a LED chip or a LED package. In an exemplary embodiment, for example, each of the LEDs may be provided within a case acting as a housing.

In the display device DD according to exemplary embodiments of the invention, the light source unit LU is disposed at a side of the light guide plate LGP. In other words, the display device DD according to exemplary embodiments of the invention includes the edge-type backlight unit BLU. In an exemplary embodiment, for example, the light guide plate LGP is spaced apart from the light source unit LU in the first direction DR1.

Hereinafter, the light guide plate LGP included in the display device DD according to exemplary embodiments will be described in more detail with reference to FIGS. 2 to 12.

Figure 2:
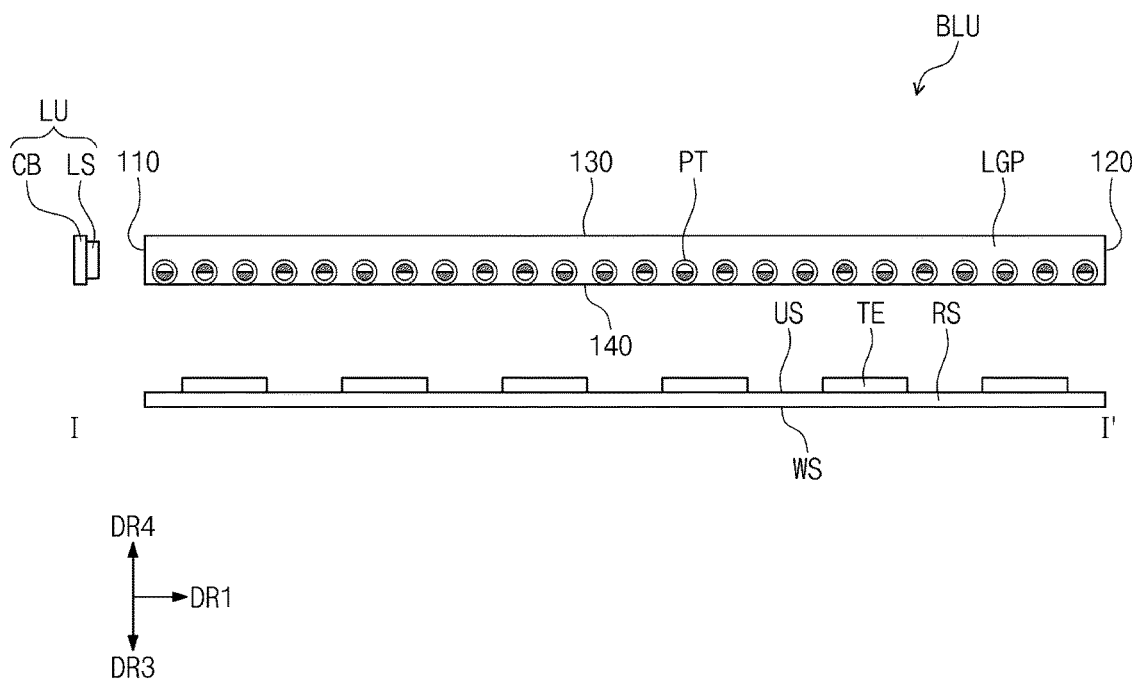
FIG. 2 is a cross-sectional view taken along line I-I' of FIG. 1.

FIG. 2 is a cross-sectional view taken along line I-I' of FIG. 1.

Referring to FIG. 2, the light guide plate LGP includes a light incident surface 110 through which the light source unit LU may provide light, an opposite surface 120 opposite to the light incident surface 110, a light exit surface 130 connecting the light incident surface 110 and the opposite surface 120 and facing the display panel DP, and a rear surface 140 opposite to the light exit surface 130.

In an exemplary embodiment, an area of the light incident surface 110 may be equal or similar to an area of the opposite surface 120. However, the invention is not limited thereto. In other exemplary embodiments, the area of the light incident surface 110 may be greater than the area of the opposite surface 120. In these exemplary embodiments, since the light incident surface 110 has a relatively great area, the amount of leakage light not incident on the light incident surface 110 may be reduced such that the light incident surface 110 having a relatively great area may improve light efficiency of the backlight unit BLU.

In an exemplary embodiment, the light guide plate LGP may include polyethylenemethacrylate ("PMMA"), polycarbonate ("PC"), polyethylene ("PE"), or cyclo-olefin polymer ("COP")-based resin, for example. However, the invention is not limited thereto. In other exemplary embodiments, the light guide plate LGP may include glass.

The light incident surface 110 faces the light source LS, and light emitted from the light source LS is incident on the light incident surface 110. The light exit surface 130 faces the display panel DP, and light provided in the light guide plate LGP may be emitted from the light exit surface 130 toward the display panel DP.

The light guide plate LGP includes a plurality of charged particles PT. The plurality of charged particles PT may be disposed to be adjacent to the rear surface 140. In other exemplary embodiments, only at least a portion of the plurality of charged particles PT may be in contact with the rear surface 140. Each of the charged particles PT may be completely embedded in the light guide plate LGP. In this exemplary embodiment, a portion of each of the charged particles PT may not protrude from or be exposed at the rear surface 140.

Figure 3:
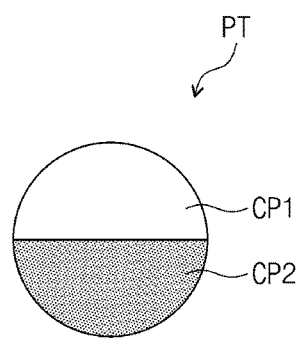
FIG. 3 is a cross-sectional view schematically illustrating an exemplary embodiment of a charged particle included in a light guide plate.

FIG. 3 is a cross-sectional view schematically illustrating an exemplary embodiment of a charged particle included in a light guide plate.

Referring to FIG. 3, each of the charged particles PT includes a first charged portion CP1 and a second charged portion CP2. The first charged portion CP1 may have a white color, and the second charged portion CP2 may have a black color. Positions of the first and second charged portions CP1 and CP2 are controlled according to a voltage applied to the transparent electrode TE disposed under the light guide plate LGP.

The transparent electrode TE may include a material generally known to persons having ordinary skill in the art, without limitation. In an exemplary embodiment, for example, the transparent electrode TE may include at least one of indium-tin oxide ("ITO"), indium-zinc oxide ("IZO"), zinc oxide ("ZnO"), or indium-tin-zinc oxide ("ITZO"). In an exemplary embodiment, for example, the transparent electrode TE may have a light transmittance of 70% or a light transmittance of 80% or more. It is preferable to increase the light transmittance of the transparent electrode TE.

The first charged portion CP1 and the second charged portion CP2 have charge values of which polarities are different from each other. In an exemplary embodiment, for example, the first charged portion CP1 having the white color may have a positive (+) charge value, and the second charged portion CP2 having the black color may have a negative (−) charge value. Hereinafter, the first charged portion CP1 having the positive (+) charge value and the second charged portion CP2 having the negative (−) charge value will be described as an example.

As illustrated in FIG. 3, each of the charged particles PT may be a janus particle, which includes two surfaces having different colors. In detail, the surface of each of the charged particles PT may be divided into a white surface and a black surface. In this case, the first charged portion CP1 may include the white surface to have the white color, and the second charged portion CP2 may include the black surface to have the black color. However, the invention is not limited thereto. Each of the charged particles PT may be a spherical particle that includes the first charged portion CP1 having a white hemispherical shape and the positive (+) charge value and the second charged portion CP2 having a black hemispherical shape and the negative (−) charge value. However, the invention is not limited thereto. In other exemplary embodiments, each of the charged particles PT may have a different shape. For example, at least one of the charged particles PT may have an elliptical shape.

Figure 4:
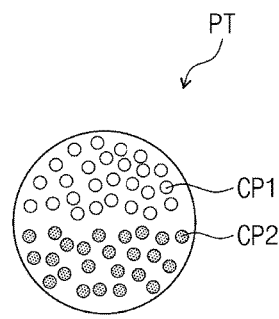
FIG. 4 is a cross-sectional view schematically illustrating another exemplary embodiment of a charged particle included in a light guide plate.

FIG. 4 is a schematic cross-sectional view illustrating an exemplary embodiment of a charged particle.

Referring to FIG. 4, each of the charged particles PT may include at least one white pigment and at least one black pigment provided in a capsule. The white pigment may be charged to have the positive (+) charge value, and the black pigment may be charged to have the negative (−) charge value. In an exemplary embodiment, the black pigment may be, for example, carbon black. A first charged portion CP1 may include the white pigment, and a second charged portion CP2 may include the black pigment. A solvent may further be provided in the capsule, and the white pigment and the black pigment may be dispersed in the solvent. In an exemplary embodiment, the solvent may be a non-polar solvent. The solvent may use a dispersion solution generally known to persons having ordinary skill in the art. A spherical capsule is illustrated as an example in FIG. 4. However, the invention is not limited thereto. The capsule may have a different shape. For example, the capsule may have a rectangular parallelepiped shape.

Generally known white pigment and black pigment to persons having ordinary skill in the art may be used. In an exemplary embodiment, each of the white pigment and the black pigment may be an inorganic pigment particle or an organic pigment particle.

Figure 5:
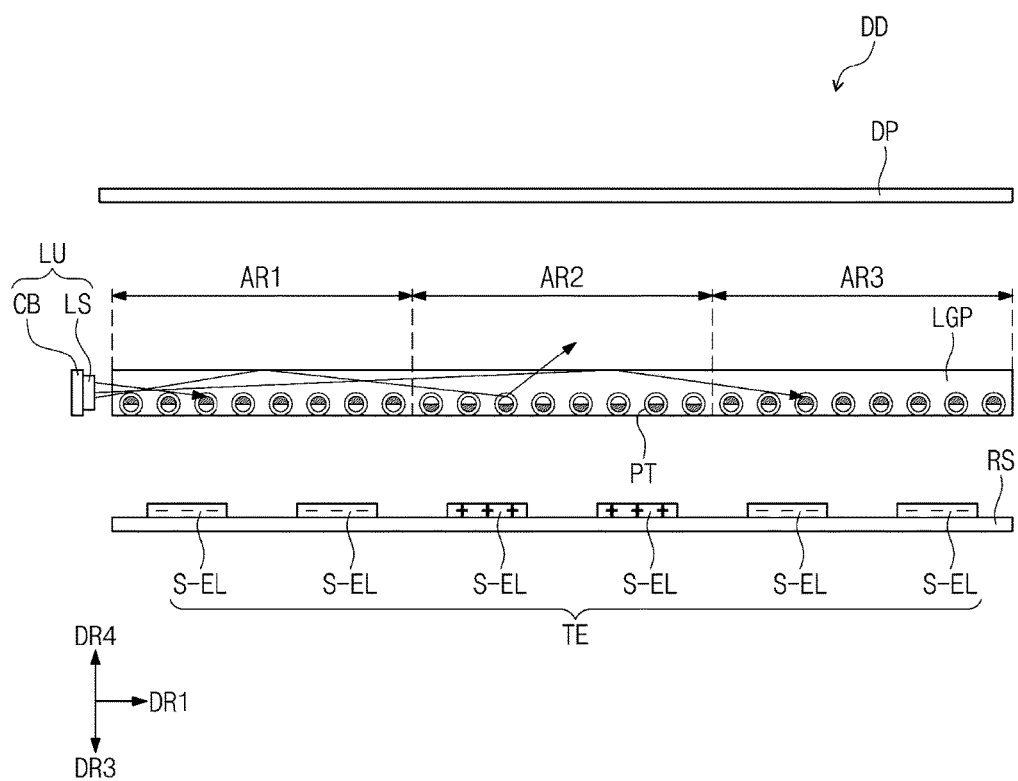
FIG. 5 is a cross-sectional view schematically illustrating an exemplary embodiment of a display device.

FIG. 5 is a cross-sectional view schematically illustrating an exemplary embodiment a display device.

As described above, the positions of the first charged portion CP1 and the second charged portion CP2 are controlled according to the polarity of the voltage applied to the transparent electrode TE. Referring to FIG. 5, when a positive (+) voltage is applied to the transparent electrode TE, the position of the first charged portion CP1 having the positive (+) charge value may be controlled to face the display panel DP. When a negative (−) voltage is applied to the transparent electrode TE, the position of the second charged portion CP2 having the negative (−) charge value may be controlled to face the display panel DP.

Referring to FIGS. 3 to 5, the light guide plate LGP may include a plurality of areas AR1, AR2, and AR3. A first area AR1, a second area AR2, and a third area AR3 included in the light guide plate LGP are illustrated as an example in FIG. 5. However, the invention is not limited thereto. The number of the areas included in the light guide plate LGP may be adjusted.

Each of the areas AR1, AR2, and AR3 may operate in a driving mode or a non-driving mode. Each of the areas AR1, AR2, and AR3 may be provided with light from the light source unit LU in the driving mode but may not be provided with light from the light source unit LU in the non-driving mode. In the driving mode, each of the areas AR1, AR2, and AR3 may operate in a first mode or a second mode.

In the first mode, the first charged portion CP1 having the white color in each of the charged particles PT may face the display panel DP, and the second charged portion CP2 having the black color in each of the charged particles PT may face the reflection sheet RS. In the first mode, the first charged portion CP1 of each of the charged particles PT may be controlled to face in the fourth direction DR4, and the second charged portion CP2 of each of the charged particles PT may be controlled to face in the third direction DR3. In the first mode, each of the charged particles PT may act as a light-reflecting pattern which reflects light provided to the charged particle PT toward the display panel DP.

In the second mode, the second charged portion CP2 having the black color in each of the charged particles PT may face the display panel DP, and the first charged portion CP1 having the white color in each of the charged particles PT may face the reflection sheet RS. In the second mode, the second charged portion CP2 of each of the charged particles PT may be controlled to face in the fourth direction DR4, and the first charged portion CP1 of each of the charged particles PT may be controlled to face in the third direction DR3. In the second mode, each of the charged particles PT may act as a light-shielding pattern which absorbs light provided to the charged particle PT.

The first mode in which the first charged portion CP1 having the white color is controlled to face the display panel DP is a light-emitting mode in which the light provided from the light source unit LU to the charged particle PT is emitted toward the display panel DP, and the second mode in which the second charged portion CP2 having the black color is controlled to face the display panel DP is a light-shielding mode in which the charged particle PT absorbs the light provided from the light source unit LU.

FIG. 5 illustrates the first and third areas AR1 and AR3 operating in the second mode and the second area AR2 operating in the first mode as an example. Light reaching the charged particles PT disposed in the second area AR2 is reflected by the first charged portions CP1 having the white color, and thus at least a portion of the light reaching the charged particles PT is emitted toward the display panel DP. Light reaching the charged particles PT disposed in each of the first and third areas AR1 and AR3 is absorbed in the second charged portions CP2 having the black color and thus the light reaching the charged particles PT is not emitted toward the display panel DP.

The transparent electrode TE may include a plurality of sub-transparent electrodes S-EL spaced apart from each other on the one surface of the reflection sheet RS. In an exemplary embodiment, the sub-transparent electrodes S-EL are spaced apart from each other in, for example, the first direction DR1.

The sub-transparent electrodes S-EL may be controlled independently of each other. Even though not shown in the drawings, the display device DD according to exemplary embodiments may further include a first light source driving unit that controls the sub-transparent electrodes S-EL independently of each other. The positive (+) voltage or the negative (−) voltage may be applied independently to each of the sub-transparent electrodes S-EL.

Since the sub-transparent electrodes S-EL are controlled independently of each other, each of the areas AR1, AR2, and AR3 of the light guide plate LGP may operate independently in the first mode or the second mode. In an exemplary embodiment, for example, when the positive (+) voltage is applied to one or some of the sub-transparent electrodes S-EL, a corresponding area (e.g., the second area AR2) of the light guide plate LGP operates in the first mode. When the negative (−) voltage is applied to another or others of the sub-transparent electrodes S-EL, a corresponding area (e.g., the first and third areas AR1 and AR3) of the light guide plate LGP operates in the second mode. In an exemplary embodiment, for example, the negative (−) voltage may be applied to the sub-transparent electrodes S-EL disposed at positions corresponding to the first area AR1 and the third area AR3, and thus the first charged portions CP1 having the positive (+) charge values in the first and third areas AR1 and AR3 may be controlled to face in the third direction DR3. In addition, the positive (+) voltage may be applied to the sub-transparent electrodes S-EL disposed at positions corresponding to the second area AR2, and thus the second charged portions CP2 having the negative (−) charge values in the second area AR2 may be controlled to face in the third direction DR3.

A principle of controlling the positions of the first and second charged portions CP1 and CP2 will be described in more detail with reference to FIGS. 6A to 6C and 7A to 7C.

Figure 6A:
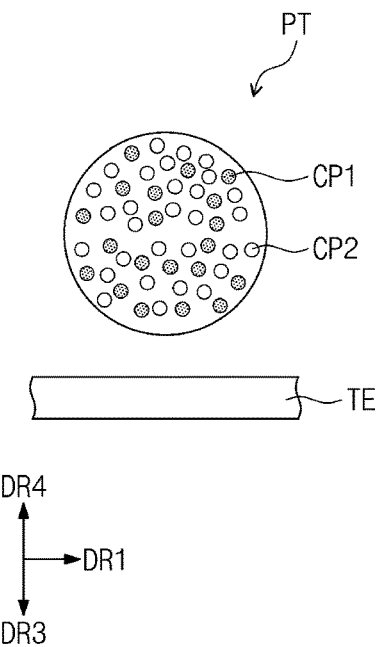
FIG. 6A is a cross-sectional view illustrating an exemplary embodiment of behavior of a charged particle of FIG. 4 when a voltage is not applied to a transparent electrode.
Figure 6B:
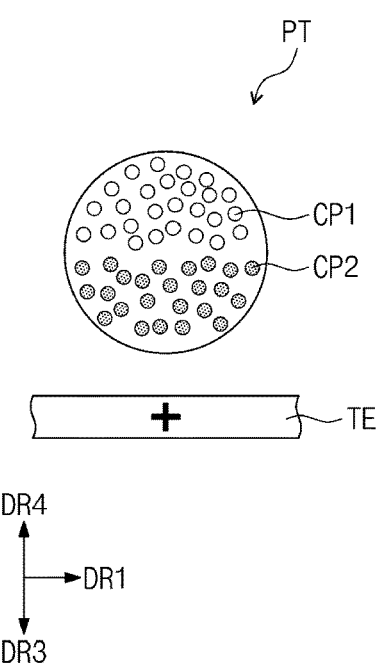
FIG. 6B is a cross-sectional view illustrating an exemplary embodiment of behavior of a charged particle of FIG. 4 when a positive voltage is applied to a transparent electrode.
Figure 6C:
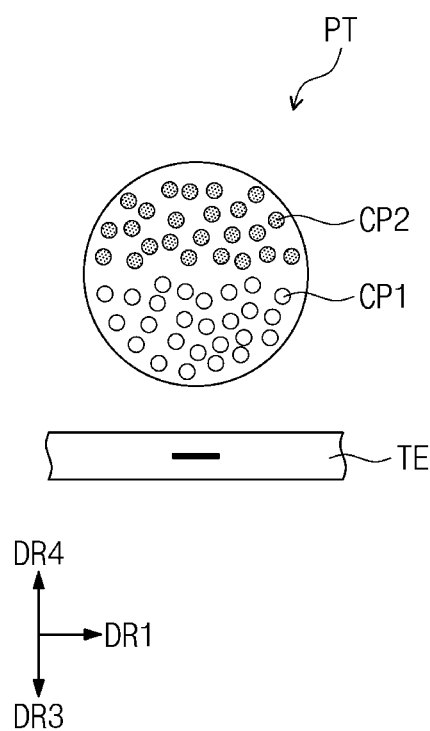
FIG. 6C is a cross-sectional view illustrating an exemplary embodiment of behavior of a charged particle of FIG. 4 when a negative voltage is applied to a transparent electrode.

FIGS. 6A to 6C illustrate an exemplary embodiment in which the charged particle PT includes a plurality of the black pigments and a plurality of the white pigment.

FIG. 6A is a cross-sectional view illustrating an exemplary embodiment of behavior of the inside of the charged particle PT when a voltage is not applied to the transparent electrode TE. Referring to FIG. 6A, the black pigments and the white pigments are randomly mixed with each other when a voltage is not applied to the transparent electrode TE. In other words, the first charged portion CP1 and the second charged portion CP2 are mixed with each other.

FIG. 6B illustrates a case in which the positive (+) voltage is applied to the transparent electrode TE, and FIG. 6C illustrates a case in which the negative (−) voltage is applied to the transparent electrode TE.

The capsule of each of the charged particles PT may be embedded and fixed in the light guide plate LGP of FIG. 2, and the black pigments and the white pigments are fluid in the capsule. Referring to FIGS. 6B and 6C, when the positive (+) voltage is applied to the transparent electrode TE, the black pigments having the negative (−) charge values moves in a direction DR3 and toward the transparent electrode TE and the white pigments having the positive (+) charge values moves in a direction DR4 and toward the display panel DP. When the negative (−) voltage is applied to the transparent electrode TE, the white pigments having the positive (+) charge values move in the direction DR3 and toward the transparent electrode TE and the black pigments having the negative (−) charge values move in a direction DR4 and toward the display panel DP. When the positive or negative voltage is applied to the transparent electrode TE, the first charged portion CP1 and the second charged portion CP2 are separated from each other and each of the capsules is divided into an area in which the first charged portion CP1 is located, and an area in which the second charged portion CP2 is located.

Figure 7A:
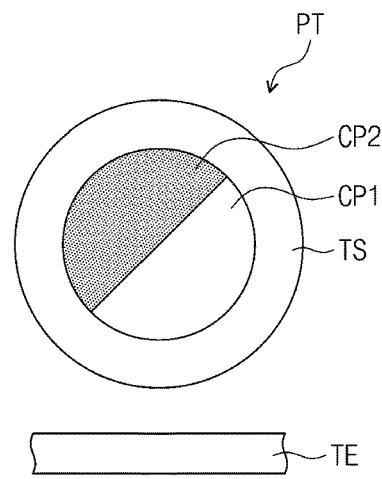
FIG. 7A is a cross-sectional view illustrating an exemplary embodiment of behavior of a charged particle of FIG. 3 when a voltage is not applied to a transparent electrode.
Figure 7B:
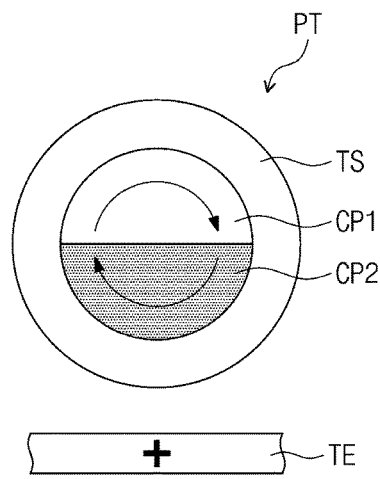
FIG. 7B is a cross-sectional view illustrating an exemplary embodiment of behavior of a charged particle of FIG. 3 when a positive voltage is applied to a transparent electrode.
Figure 7C:
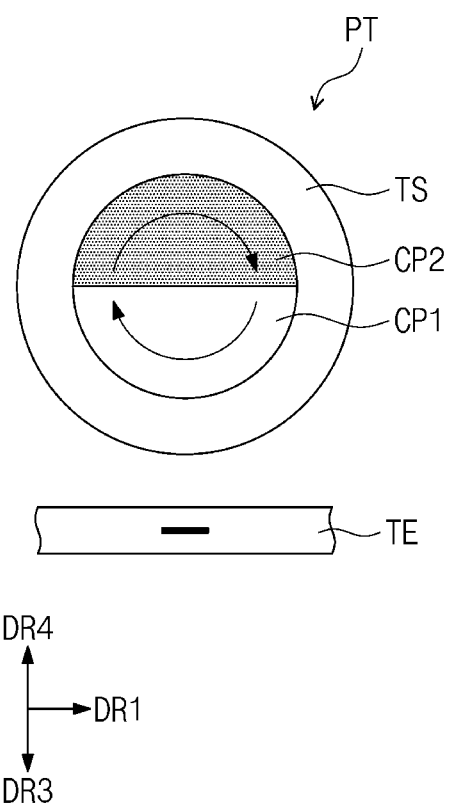
FIG. 7C is a cross-sectional view illustrating an exemplary embodiment of behavior of a charged particle of FIG. 3 when a negative voltage is applied to a transparent electrode.

FIGS. 7A to 7C illustrate an exemplary embodiment of behavior of the inside of the charged particle PT in which the charged particle PT is the janus particle.

Referring to FIGS. 7A to 7C, the display device DD according to exemplary embodiments of the invention may further include a protective layer TS surrounding each of the charged particles PT. The protective layer TS may be embedded and fixed in the light guide plate LGP of FIG. 2, and the charged particle PT disposed in the protective layer TS may rotate according to a voltage applied to the transparent electrode TE.

The protective layer TS may include a material generally known to persons having ordinary skill in the art, without limitation. In the case in which each of the charged particles PT is the janus particle, the protective layer TS may include a material having viscosity. Thus, the charged particle PT can rotate freely in the protective layer TS. In an exemplary embodiment, for example, each of the charged particles PT may be suspended in an oil bubble that is the protective layer TS. In another exemplary embodiment, for example, the protective layer TS may include polyurethane, poly-urea, melamine-formaldehyde resin, polyamide, polyester, polysulfonamide, (meth)acrylic acid ester, polycarbonate, or gelatin. However, the invention is not limited thereto.

Even though not shown in FIGS. 6A to 6C, in the case in which each of the charged particles PT includes the black pigments and the white pigments in the capsule, each of the charged particles PT may be surrounded by the protective layer TS, and the protective layer TS may include a material generally known to persons having ordinary skill in the art, without limitation.

FIG. 7A is a cross-sectional view illustrating an exemplary embodiment of behavior of the charged particle PT when the transparent electrode TE is in a ground state. When a voltage is not applied to the transparent electrode TE, each of the charged particles PT may rotate freely in the protective layer TS and the positions of the first and second charged portions CP1 and CP2 of the charged particle PT are random.

FIG. 7B illustrates a case in which the positive (+) voltage is applied to the transparent electrode TE, and FIG. 7C illustrates a case in which the negative (−) voltage is applied to the transparent electrode TE. Referring to FIG. 7B, when the positive (+) voltage is applied to the transparent electrode TE, the charged particle PT rotates in the protective layer TS such that the second charged portion CP2 having the negative (−) charge value is controlled to face in the direction DR3 toward the transparent electrode TE and the first charged portion CP1 having the positive (+) charge values is controlled to face in a direction DR4 the display panel DP. Referring to FIG. 7C, when the negative (−) voltage is applied to the transparent electrode TE, the charged particle PT rotates in the protective layer TS such that the first charged portion CP1 having the positive (+) charge values is controlled to face in the direction DR3 toward the transparent electrode TE and the second charged portion CP2 having the negative (−) charge values is controlled to face in a direction DR4 toward the display panel DP.

Figure 8:
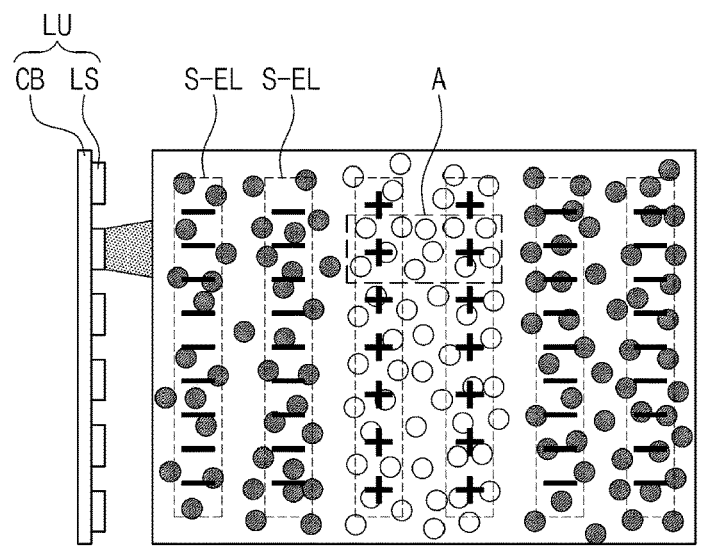
FIG. 8 is a schematic plan view illustrating an exemplary embodiment of a backlight unit included in a display device.
Figure 9:
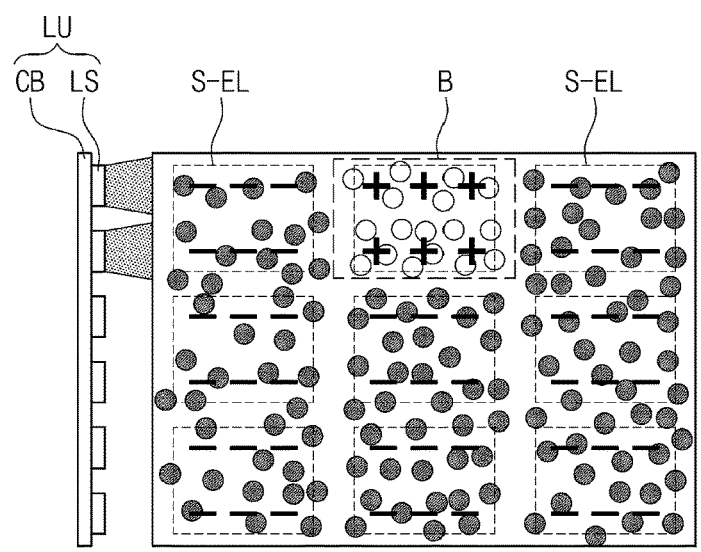
FIG. 9 is a schematic plan view illustrating another exemplary embodiment of a backlight unit included in a display device.

FIG. 8 is a schematic plan view illustrating an exemplary embodiment of a backlight unit included in a display device. FIG. 9 is a schematic plan view illustrating another exemplary embodiment of a backlight unit included in a display device.

Referring to FIGS. 8 and 9, a display device DD according to exemplary embodiments of the invention may include an edge-type backlight unit BLU capable of performing a 2-dimensional ("2D") local dimming function.

As described above, the light source unit LU may include a plurality of light sources LS spaced apart from each other on the printed circuit board CB, and the light sources LS may be driven independently of each other. FIG. 8 illustrates an exemplary case in which one of six light sources LS provides light to the light guide plate LGP, and FIG. 9 illustrates an exemplary case in which two of six light sources LS provide light to the light guide plate LGP. However, the invention is not limited thereto. A total number of the light sources LS which provide light to the light guide plate LGP can be varied.

Even though not shown in the drawings, the display device DD according to exemplary embodiments may further include a second light source driving unit that controls the light sources LS independently of each other. In addition, the display device DD according to exemplary embodiments of the invention may further include an image analysis unit that analyzes an input image to generate a local dimming signal. The image analysis unit may control the first light source driving unit and the second light source driving unit based on the result of analysis of the input image. The image analysis unit may control the second light source driving unit to control the light sources LS independently of each other, and the first light source driving unit may individually control each of the sub-transparent electrodes S-EL in response to the local dimming signal provided from the image analysis unit. Thus, the backlight unit BLU may perform the local dimming function.

The light sources LS may be individually driven to perform a 1-dimensional ("1D") local dimming function in the second direction DR2, and the sub-transparent electrodes S-EL may be individually controlled to perform a 1D local dimming function in the first direction DR1. As a result, the backlight unit BLU can perform the 2D local dimming function.

In FIG. 8, only an area 'A' of the light guide plate LGP provides light to the display panel DP, and the other area of the light guide plate LGP does not provide light to the display panel DP. In FIG. 9, only an area 'B' of the light guide plate LGP provides light to the display panel DP, and the other area of the light guide plate LGP does not provide light to the display panel DP. In other words, the backlight unit BLU may perform the local dimming function that can control both the local dimming in the first direction DR1 and the local dimming in the second direction DR2.

As illustrated in FIG. 8, each of the sub-transparent electrodes S-EL may have a rod shape when viewed in a plan view. The term 'when viewed in a plan view' may mean 'when viewed in the third direction DR3 which corresponds to the thickness direction of the display device DD according to exemplary embodiments of the invention'. Each of the sub-transparent electrodes S-EL may extend in the second direction DR2, and the sub-transparent electrodes S-EL may be spaced apart from each other in the first direction DR1. In exemplary embodiments, the sub-transparent electrodes S-EL may be arranged in the first direction DR1 at equal distances. In other exemplary embodiments, the distances between the sub-transparent electrodes S-EL may be different from each other.

Referring to FIGS. 5 and 9, each of the sub-transparent electrodes S-EL may have a square shape when viewed in a plan view. When the light guide plate LGP includes a plurality of areas, the number of the areas may correspond to or be equal to the number of the sub-transparent electrodes S-EL.

In FIGS. 2 and 5, the transparent electrode TE is disposed on a top surface US of the reflection sheet RS. However, the invention is not limited thereto.

Figure 10:
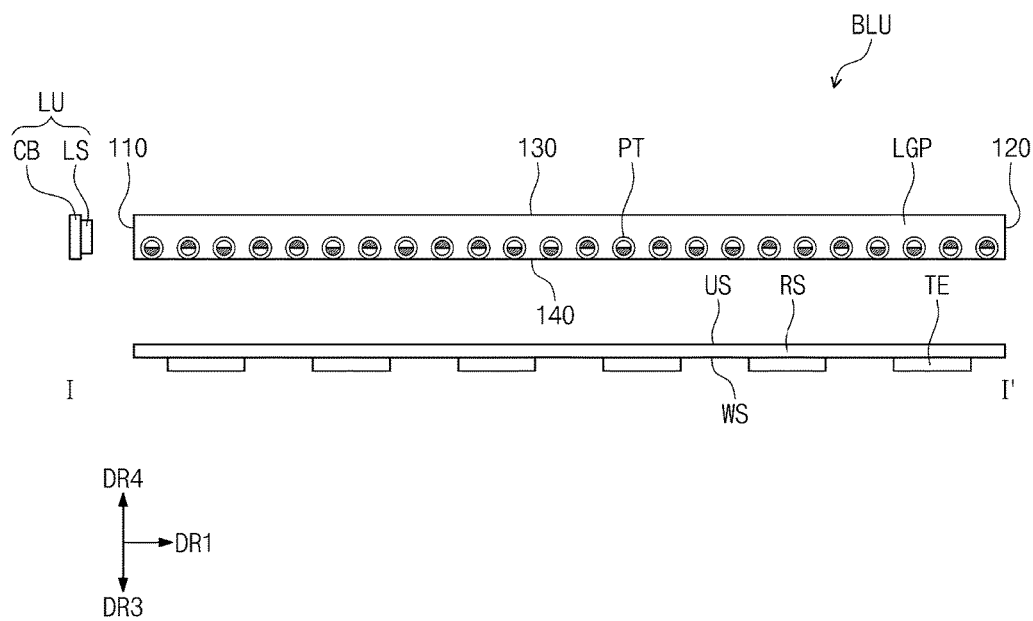
FIG. 10 is a schematic cross-sectional view taken along line I-I' of FIG. 1 illustrating an exemplary embodiment of a backlight unit included in a display device.

FIG. 10 is a schematic cross-sectional view taken along line I-I' of FIG. 1 illustrating an exemplary embodiment of a backlight unit included in a display device. Referring to FIG. 10, the transparent electrode TE may be disposed on a bottom surface WS of the reflection sheet RS. If the transparent electrode TE is disposed on the top surface US of the reflection sheet RS, the transparent electrode TE may control the charged particles PT more easily than the transparent electrode TE disposed on the bottom surface WS because the transparent electrode TE disposed on the top surface US may be nearer/closer to the charged particles PT than the transparent electrode TE disposed on the bottom surface WS of the reflection sheet RS. On the other hand, when the transparent electrode TE is disposed on the bottom surface WS of the reflection sheet RS, it is possible to prevent a partial loss of light toward the reflection sheet RS, which may occur while the light passes through the transparent electrode TE disposed on the top surface US of the reflection sheet RS.

Figure 11:
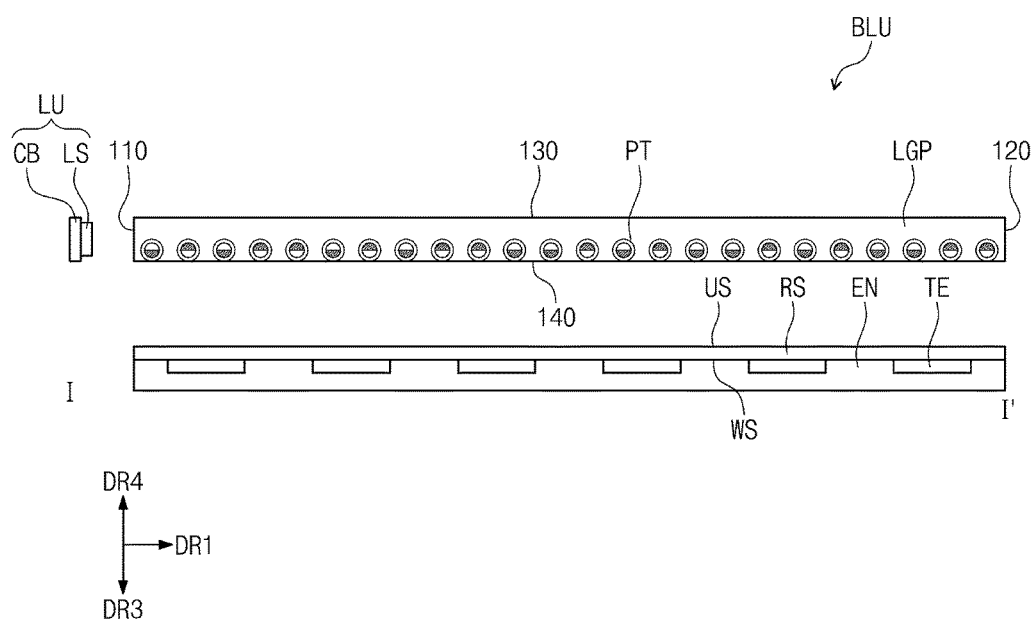
FIG. 11 is a schematic cross-sectional view taken along line I-I' of FIG. 1 illustrating another exemplary embodiment of a backlight unit included in a display device.

FIG. 11 is a schematic cross-sectional view taken along line I-I' of FIG. 1 illustrating another exemplary embodiment of a backlight unit included in a display device.

Referring to FIG. 11, when the transparent electrode TE is disposed on the bottom surface WS of the reflection sheet RS, the display device DD according to exemplary embodiments of the invention may further include a sealing layer EN that is disposed on the bottom surface WS of the reflection sheet RS to cover the transparent electrode TE. When the transparent electrode TE includes the plurality of sub-transparent electrodes S-EL, the sealing layer EN may cover each of the sub-transparent electrodes S-EL. The sealing layer EN may include an insulating material.

Figure 12:
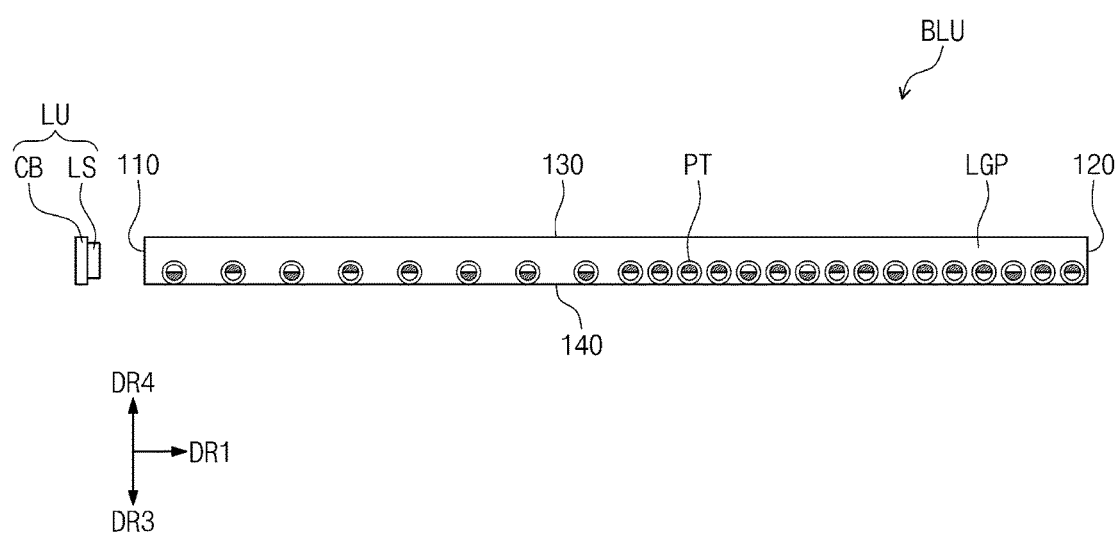
FIG. 12 is a schematic cross-sectional view illustrating an exemplary embodiment of a light source unit and a light guide plate included in a display device.

FIG. 12 is a schematic cross-sectional view illustrating an exemplary embodiment of a light source unit and a light guide plate included in a display device.

FIG. 12 illustrates an exemplary embodiment that a distribution density of the charged particles PT progressively increases from the light incident surface 110 to the opposite surface 120. The density of the charged particles PT per unit area may progressively increase in the first direction DR1. When the first charged portion CP1, having the white color, of each of the charged particles PT is controlled to face in the direction DR4 and toward the display panel DP, each of the charged particles PT may act as the light-reflecting pattern of the light guide plate LGP. Generally in the light guide plate LGP without the charged particles PT, the amount of light emitted from the light exit surface 130 is reduced at a position far away from the light source unit LU. However, if the density of the charged particles PT acting as the light-reflecting patterns increases as a distance from the light source unit LU increases, the reduction in the amount of light emitted from the light exit surface 130 at a position far away from the light source unit LU may be inhibited or prevented to improve brightness uniformity of the display device DD. In FIG. 12, the distribution density of the charged particles PT is adjusted by adjusting the number of the charged particles PT. However, the invention is not limited thereto. In other exemplary embodiments, the distribution density of the charged particles PT may be adjusted by adjusting sizes of the charged particles PT or by adjusting both the sizes and the number of the charged particles PT.

Figure 13A:
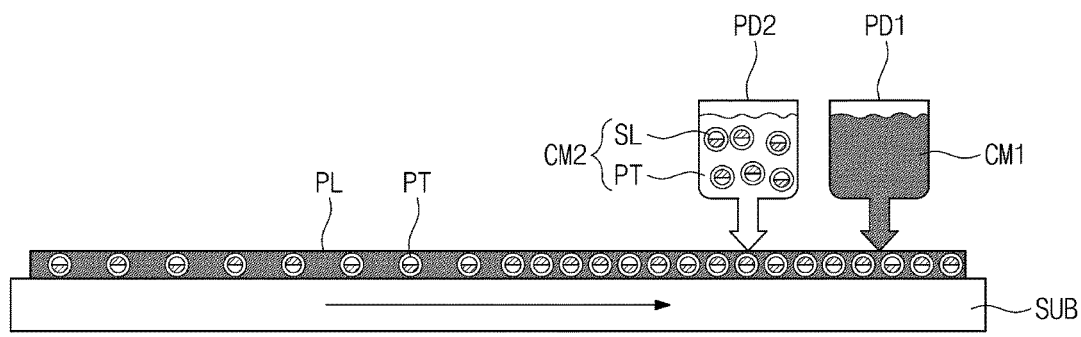
FIGS. 13A to 13C are cross-sectional views illustrating an exemplary embodiment of a method of manufacturing a light guide plate included in a display device.
Figure 13B:
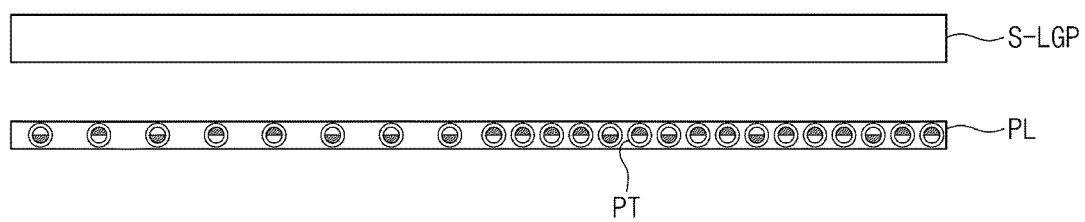
Figure 13C:
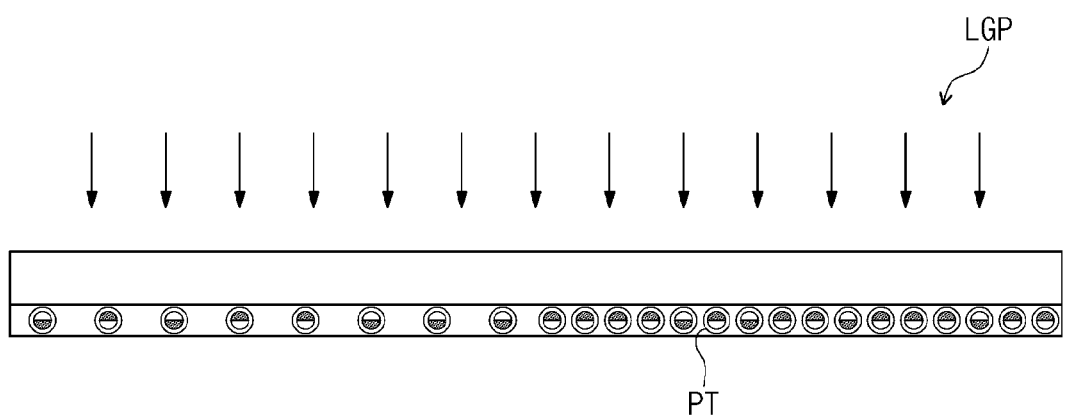

FIGS. 13A to 13C are cross-sectional views illustrating an exemplary embodiment of a method of manufacturing a light guide plate included in a display device.

Hereinafter, a method of manufacturing the light guide plate LGP including a plurality of charged particles PT will be described with reference to FIGS. 13A to 13C. Hereinafter, differences between this exemplary embodiment and the above exemplary embodiments will be mainly described, and the descriptions to the same technical features and/or elements as in the above exemplary embodiments will be omitted for the purpose of ease and convenience in explanation.

A first composition CM1 and a second composition CM2 are prepared. The first composition CM1 includes the same material as the light guide plate LGP, and the second composition CM2 includes a plurality of the charged particles PT and a solvent SL in which the charged particles PT are dispersed. In other exemplary embodiments, the first composition CM1 may include a different material from the light guide plate LGP. In this case, the first composition CM1 may include a material of which a refractive index is equal or similar to that of the light guide plate LGP, for example.

Referring to FIG. 13A, a sub-layer PL in which the first and second compositions CM1 and CM2 are mixed with each other may be provided on a substrate SUB by using a first provider PD1 supplying the first composition CM1 and a second provider PD2 supplying the second composition CM2. In FIG. 13A, the substrate SUB is coated with the first composition CM1 and the second composition CM2 while the substrate SUB moves. However, the invention is not limited thereto. In other exemplary embodiments, the substrate SUB may be coated with the first composition CM1 and the second composition CM2 while the first and second providers PD1 and PD2 move. Even though not shown in the drawings, the sub-layer PL may be semi-hardened by ultraviolet ("UV") and heat. Thus, the sub-layer PL may not flow. However, the invention is not limited thereto.

Referring to FIG. 13B, a sub-light guide plate S-LGP is prepared and is then disposed on the sub-layer PL in which the first and second compositions CM1 and CM2 are mixed with each other. The sub-light guide plate S-LGP does not include the charged particles PT.

Referring to FIG. 13C, the sub-layer PL including the first and second compositions CM1 and CM2 mixed with each other may adhere to a bottom surface of the sub-light guide plate S-LGP to form a light guide plate LGP. The formed light guide plate LGP includes a plurality of the charged particles PT. In an exemplary embodiment, the sub-light guide plate S-LGP and the sub-layer PL may adhere to each other by, for example, UV. In the case, the sub-light guide plate S-LGP before the adhesion may be provided by first-hardening or semi-hardening a composition, and the light guide plate LGP may be finally provided by performing a second hardening process on the sub-light guide plate S-LGP. However, the method of adhering the sub-light guide plate S-LGP and the sub-layer PL is not limited to the above method.

In the exemplary embodiment of FIGS. 13A to 13C, the distribution density of the charged particles PT is not uniform. However, the invention is not limited thereto. The distribution density or the density per unit area of the charged particles PT may be controlled by adjusting a moving speed of the substrate SUB and/or by adjusting the amount of the second composition CM2 supplied from the second provider PD2.

The display device according to exemplary embodiments of the invention may include the edge-type backlight unit capable of performing the 2D local dimming function. A conventional edge-type backlight unit may be difficult to realize accurate 2D local dimming, as compared with a direct-type backlight unit. In detail, the conventional edge-type backlight unit may be disposed at a side of a light guide plate, and thus the realization of 2D local dimming may be difficult by the conventional edge-type backlight unit. To realize the 2D local dimming using the conventional edge-type backlight units, an edge-type backlight unit may use light sources spaced apart from each other in a first direction and light sources spaced apart from each other in a second direction which crosses the first direction. In this case, light provided into a light guide plate may be diffused in the light guide plate, and thus not only a target area but also an area around a target area (e.g., a rod-shaped area including the target area in the first direction and a rod-shaped area including the target area in the second direction) may also be bright. As a result, accurate 2D local dimming may be difficult. However, in the backlight unit BLU included in the display device DD according to exemplary embodiments of the invention, the charged particles PT disposed in an area except a target area may absorb light if a required voltage is applied to the sub-transparent electrodes S-EL disposed under the light guide plate LGP. Thus, the accurate 2D local dimming can be realized by the backlight unit BLU of the display device DD according to the invention. On the other hand, a direct-type backlight unit may be thicker than an edge-type backlight unit. Thus, it is difficult to thin a display device including the direct-type backlight unit.

According to exemplary embodiments of the invention, the plurality of charged particles controlled by the transparent electrode may be embedded in the light guide plate. Thus, the display device according to exemplary embodiments of the invention may include the edge-type backlight unit and may realize the accurate 2D local dimming function. In addition, each of the charged particles may act as the light-reflecting pattern of the light guide plate in a certain condition, and thus a cost of the display device according to the invention may be reduced as compared with a display device including additional light-reflecting patterns.

The display device according to exemplary embodiments of the invention may include the edge-type backlight unit capable of performing the 2D local dimming function. Thus, the thin display device with an relatively excellent contrast ratio may be realized.

According to exemplary embodiments of the invention, the power consumption of the display device may be reduced.

While the invention has been described with reference to exemplary embodiments, it will be apparent to those skilled in the art that various changes and modifications may be made without departing from the spirits and scopes of the present disclosure. Therefore, it should be understood that the above exemplary embodiments are not only possible exemplary embodiments, but illustrative exemplary embodiments. Thus, the scopes of the invention are to be determined by the broadest permissible interpretation of the following claims and their equivalents, and shall not be restricted or limited by the foregoing description.

What is claimed is:
1. A display device comprising:
a backlight unit; and
a display panel disposed on the backlight unit,
wherein the backlight unit comprises:
  a light guide plate including a plurality of charged particles;
  a light source unit disposed at a side of the light guide plate and which provides light to the light guide plate; and
  a transparent electrode disposed under the light guide plate,
wherein each of the plurality of charged particles comprises a first charged portion and a second charged portion which have charge values of which polarities are different from each other,
wherein the first charged portion reflects the light received from the light source unit, wherein the second charged portion absorbs the light received from the light source unit, and wherein positions of the first and second charged portions of each of the plurality of charged particles are controlled based on a voltage applied to the transparent electrode.

2. The display device of claim 1, wherein the first charged portion has a positive charge value, and wherein the second charged portion has a negative charge value.

3. The display device of claim 1, wherein the backlight unit further comprises a reflection sheet disposed under the light guide plate, wherein the light guide plate includes a plurality of areas, wherein each of the plurality of areas operates in a first mode where the charged particles in the area reflects the light received from the light source unit or in a second mode where the charged particles in the area absorbs the light received from the light source unit, wherein, in the first mode, the first charged portion of the charged particles in the area faces the display panel and the second charged portion of the charged particles in the area faces the reflection sheet, and wherein, in the second mode, the second charged portion of the charged particles in the area faces the display panel and the first charged portion of the charged particles in the area faces the reflection sheet.

4. The display device of claim 1, wherein the light guide plate comprises:

a light incident surface on which the light is incident;

an opposite surface opposite to the light incident surface;

a light exit surface which connects the light incident surface and the opposite surface; and a rear surface opposite to the light exit surface, wherein the plurality of charged particles is disposed to be adjacent to the rear surface.

5. The display device of claim 1, wherein a surface of each of the plurality of charged particles is divided into a white surface and a black surface, wherein the first charged portion includes the white surface, and wherein the second charged portion includes the black surface.

6. The display device of claim 1, wherein the first charged portion includes a white pigment, and wherein the second charged portion includes a black pigment.

7. The display device of claim 1, further comprising:

a protective layer which surrounds each of the plurality of charged particles.

8. The display device of claim 1, wherein the light source unit comprises:

a printed circuit board; and a plurality of light sources spaced apart from each other on the printed circuit board, wherein the plurality of light sources is driven independently of each other.

9. The display device of claim 1, wherein the transparent electrode comprises a plurality of sub-transparent electrodes spaced apart from each other, and wherein the plurality of sub-transparent electrodes is controlled independently of each other.

10. The display device of claim 9, wherein each of the plurality of sub-transparent electrodes has a rod shape when viewed in a plan view.

11. The display device of claim 9, wherein each of the plurality of sub-transparent electrodes has a square shape when viewed in a plan view.

12. The display device of claim 1, wherein the backlight unit further comprises a reflection sheet disposed under the light guide plate, and wherein the transparent electrode is disposed on a top surface of the reflection sheet.

13. The display device of claim 1, wherein the backlight unit further comprises a reflection sheet disposed under the light guide plate, and wherein the transparent electrode is disposed on a bottom surface of the reflection sheet.

14. The display device of claim 13, further comprising:

a sealing layer disposed on the bottom surface of the reflection sheet and which covers the transparent electrode.

15. The display device of claim 4, wherein a distribution density of the plurality of charged particles progressively increases from the light incident surface toward the opposite surface.

* * * * *